(12) United States Patent
Oguchi

(10) Patent No.: US 9,530,061 B2
(45) Date of Patent: Dec. 27, 2016

(54) EXTRACTION METHOD FOR EXTRACTING A PITCHING SCENE AND DEVICE FOR THE SAME

(71) Applicant: FUJITSU LIMITED, Kawasaki-shi, Kanagawa (JP)

(72) Inventor: Atsushi Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/578,585

(22) Filed: Dec. 22, 2014

(65) Prior Publication Data
US 2015/0206013 A1    Jul. 23, 2015

(30) Foreign Application Priority Data
Jan. 20, 2014 (JP) .................... 2014-008171

(51) Int. Cl.
G06K 9/00 (2006.01)
G06F 17/30 (2006.01)

(52) U.S. Cl.
CPC ..... *G06K 9/00744* (2013.01); *G06F 17/30265* (2013.01); *G06K 9/00765* (2013.01)

(58) Field of Classification Search
CPC ............ G06K 9/00711; G06K 9/00718; G06K 9/00724; G06K 9/00744; G06K 9/00765; G06T 2207/30221; G06F 17/30796; H04N 5/147; H04N 21/23418; H04N 21/8456
See application file for complete search history.

(56) References Cited

U.S. PATENT DOCUMENTS

| | | | |
|---|---|---|---|
| 2003/0182620 A1* | 9/2003 | Errico et al. | 715/500.1 |
| 2007/0294716 A1* | 12/2007 | Jeong et al. | 725/19 |
| 2008/0044085 A1* | 2/2008 | Yamamoto | 382/190 |
| 2008/0140232 A1* | 6/2008 | Lee et al. | 700/91 |
| 2008/0175486 A1 | 7/2008 | Yamamoto | 382/206 |

FOREIGN PATENT DOCUMENTS

| | | |
|---|---|---|
| JP | 2005-295296 A | 10/2005 |
| JP | 2007-124368 A | 5/2007 |
| JP | 2007-274400 A | 10/2007 |
| JP | 2008-176538 A | 7/2008 |
| JP | 2009-20621 A | 1/2009 |

OTHER PUBLICATIONS

Espacenet English Abstract of Japanese Publication No. 2008-176538, Published Jul. 31, 2008.
Taiwanese Office Action dated Dec. 8, 2015 in corresponding Taiwanese Patent Application No. 103144778.
Patent Abstracts of Japan, Publication No. 2005-295296, published Oct. 20, 2005.

(Continued)

*Primary Examiner* — Andrew W Johns
(74) *Attorney, Agent, or Firm* — Staas & Halsey LLP

(57) ABSTRACT

An extraction method includes acquiring a captured baseball game footage that includes a plurality of frames; and extracting, as a frame representing a first pitching scene of a plate appearance, a frame corresponding to an initial state of a ball count from among frames representing pitcher pitching scenes included in the captured baseball game footage.

8 Claims, 21 Drawing Sheets

(56) References Cited

OTHER PUBLICATIONS

Espacenet English Abstract of Japanese Publication No. 2007-124368, Published May 17, 2007.
Espacenet English Abstract of Japanese Publication No. 2007-274400, Published Oct. 18, 2007.
Espacenet English Abstract of Japanese Publication No. 2009-20621, Published Jan. 29, 2009.
Korean Office Action dated Nov. 6, 2015 in corresponding Korean Patent Application No. 10-2014-0192012.
Taiwanese Office Action received Aug. 1, 2016 in corresponding Taiwanese Patent Application No. 103144778.

\* cited by examiner

FIG.15

| | | NUMBER OF RUNNERS | OUT COUNT | SCORE | TOTAL | CHANGE IN BATTER |
|---|---|---|---|---|---|---|
| STATE ONE PITCH BEFORE | | 1 | 0 | 0 | 1 | – |
| RESULT OF CURRENT PITCH | HIT | 2 | 0 | 0 | 2 | YES |
| | RBI HIT | 1 | 0 | 1 | 2 | YES |
| | HOME RUN | 0 | 0 | 2 | 2 | YES |
| | OUT | 1 | 1 | 0 | 2 | YES |
| | DOUBLE PLAY | 0 | 2 | 0 | 2 | YES |
| | SACRIFICE FLY SQUEEZE | 0 | 1 | 1 | 2 | YES |
| | SACRIFICE HIT (ONLY TO GAIN A BASE) | 1 | 1 | 0 | 2 | YES |
| | PICKOFF (SAFE) | 1 | 0 | 0 | 1 | NO |
| | PICKOFF (OUT) | 0 | 1 | 0 | 1 | NO |
| | WILD PITCH ETC. (SCORED) | 0 | 0 | 1 | 1 | NO |
| | WILD PITCH ETC. (ONLY TO GAIN A BASE) | 1 | 0 | 0 | 1 | NO |

EXTRACTION METHOD FOR EXTRACTING A PITCHING SCENE AND DEVICE FOR THE SAME

CROSS-REFERENCE TO RELATED APPLICATION

This application is based upon and claims the benefit of priority of the prior Japanese Patent Application No. 2014-008171, filed on Jan. 20, 2014, the entire content of which is incorporated herein by reference.

FIELD

The embodiments discussed herein are related to a storage medium stored with the extraction program, an extraction method, and a baseball footage metadata generation device.

BACKGROUND

Known services exist that distribute captured baseball game footage live, and distribute captured baseball game footage as video on demand (VoD) content. When distributed as VoD content, for example, the viewer selects a desired inning, which is then presented to the viewer in a viewable form. In order to present such VoD content, footage is manually extracted for each inning.

Technology has been proposed that extracts highlight scenes from captured baseball game footage.

RELATED PATENT DOCUMENTS

Japanese Laid-Open Patent Publication No. 2005-295296

SUMMARY

According to an aspect of the embodiments, a non-transitory recording medium stores a program that causes a computer to execute an extraction process. The process includes acquiring a captured baseball game footage that includes a plurality of frames; and extracting, as a frame representing a first pitching scene of a plate appearance, a frame corresponding to an initial state of a ball count from among frames representing pitcher pitching scenes included in the captured baseball game footage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram explaining determination of a batter change based on the total of a number of runners, an out count, and a score;

DESCRIPTION OF EMBODIMENTS

An example of an exemplary embodiment according to the technology disclosed herein is explained in detail below with reference to the drawings. In the present exemplary embodiment, explanation is given regarding an example of a baseball footage metadata generation device applied to a footage distribution system.

First Exemplary Embodiment

Figure 1:
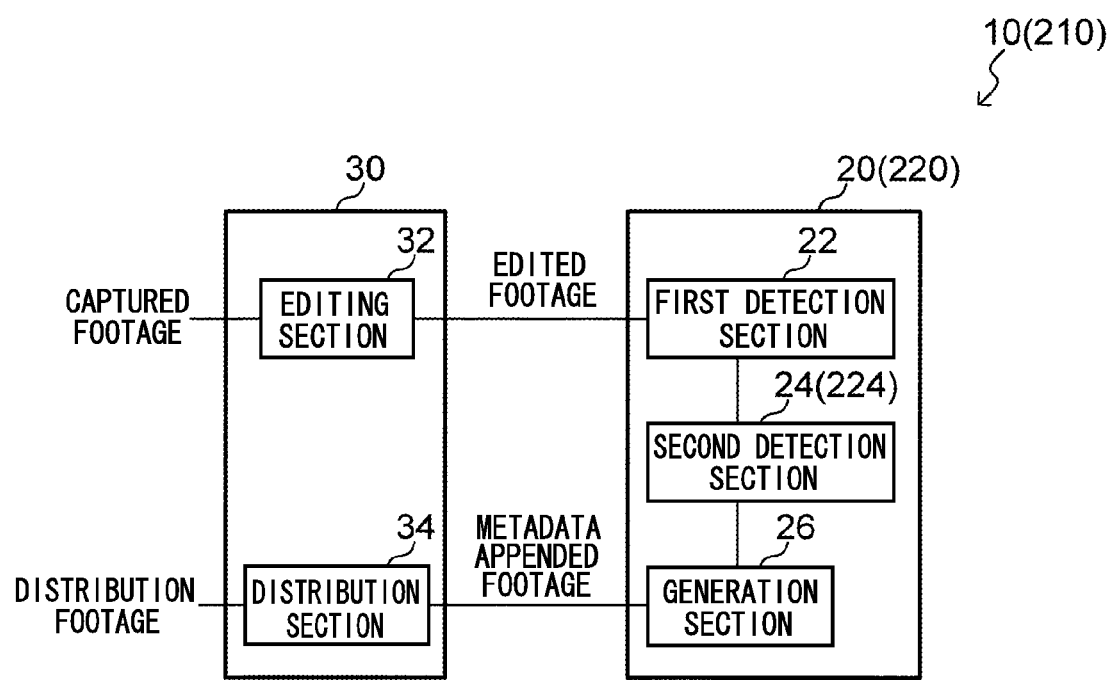
FIG. 1 is a functional block diagram illustrating a schematic configuration of a footage distribution system according to a first and a second exemplary embodiment.

As illustrated in FIG. 1, a footage distribution system 10 according to a first exemplary embodiment includes a baseball footage metadata generation device 20, and a distribution device 30. The baseball footage metadata generation device 20 and the distribution device 30 are connected through a network. In the footage distribution system 10, footage, to which metadata generated by the baseball footage metadata generation device 20 has been added, is distributed through the network to a specified terminal by the distribution device 30. The baseball footage metadata generation device 20 includes a first detection section 22, a second detection section 24, and a generation section 26. The distribution device 30 includes an editing section 32, and a distribution section 34.

First, detailed explanation is given regarding individual sections of the distribution device 30.

The editing section 32 acquires footage capturing a baseball game (referred to as "captured footage" hereafter). The captured footage is footage captured at a frame rate such as 30 fps, or 60 fps for example, and includes plural frames. Each frame is associated to time data indicating an elapsed time since the start of capture of the captured footage.

Figure 2:
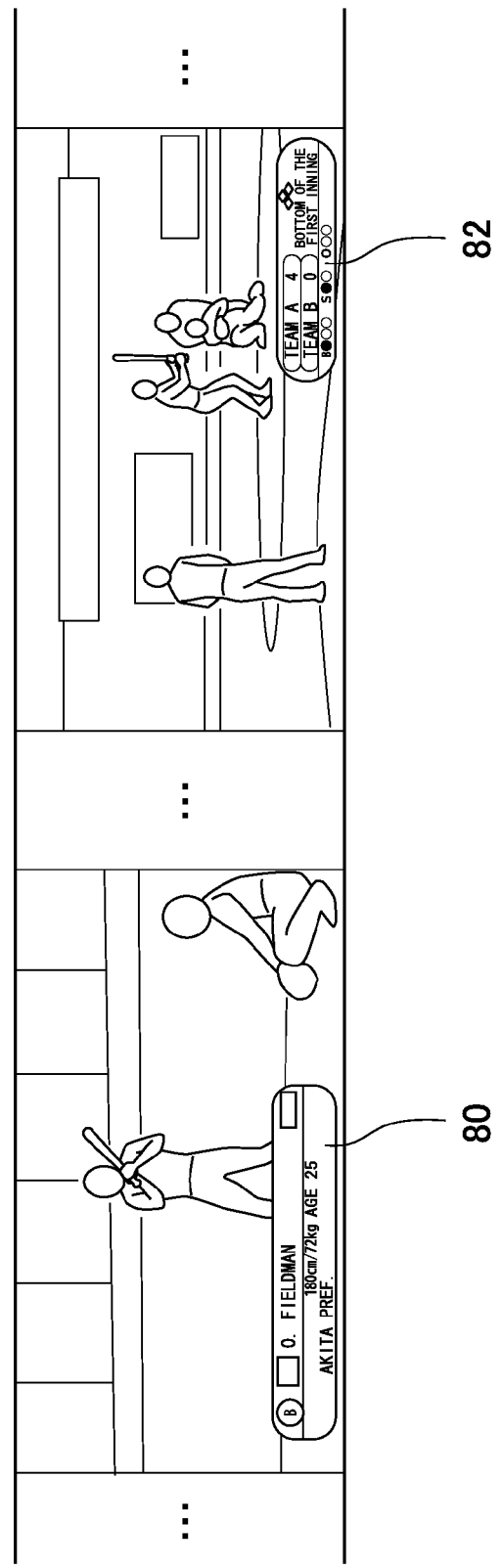
FIG. 2 is a diagram explaining an example of editing.

The editing section 32 applies editing commands, designated by operation of an operator using a display device and input device, not illustrated in the drawings, to the captured footage using image processing. As illustrated in FIG. 2, for example, the editing commands include adding an overlay 80 showing player data, and an overlay 82 showing the game status, for each frame corresponding to a specified scene in the captured footage. Footage in which editing has been performed on the captured footage by the editing section 32 is referred to as "edited footage" below. The editing section 32 transmits edited footage to the baseball footage metadata generation device 20.

The distribution section 34 acquires footage to which metadata generated by the baseball footage metadata generation device 20 has been added (referred to as "metadata appended footage" below; detailed explanation is given below). The metadata appended footage is converted to distribution footage according to specified standards, and distributed to a distribution destination terminal (not illustrated in the drawings) by the distribution section 34.

Next, detailed explanation follows regarding individual sections of the baseball footage metadata generation device 20.

Figure 3:
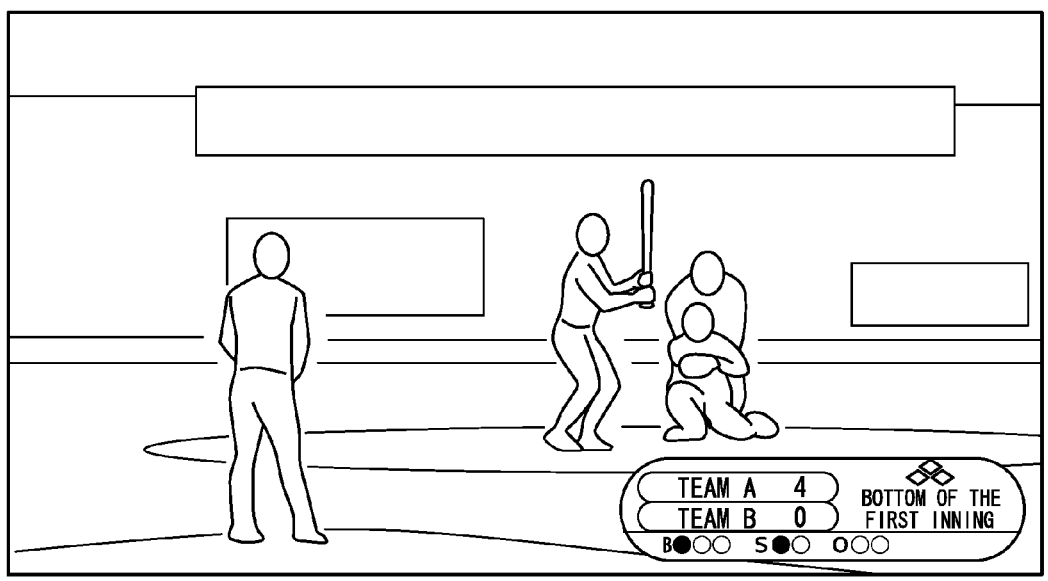
FIG. 3 is a diagram explaining a specific cut.

The first detection section 22 acquires edited footage transmitted by the distribution device 30. The first detection section 22 extracts from respective plural frames included in the edited footage, frames representing a cut captured at a camera angle used in a pitcher's pitching scenes (referred to as the "specific cut" hereafter). Note that a cut is a continuous segment captured at the same camera angle. In the present exemplary embodiment explanation follows regarding a case in which the specific cut is a cut captured in a batter-direction from behind the pitcher, as illustrated in FIG. 3.

Specifically, the first detection section 22 extracts image characteristics for each frame. The image characteristics are characteristics represented by pixel data such as the luminance and color of each pixel inside the frame. The first detection section 22 derives a similarity value between the reference image characteristics extracted from a pre-prepared frame representing the specific cut, and extracted image characteristics extracted from each frame of the edited footage. The first detection section 22 extracts as frames representing the specific cut any frames with extracted image characteristics having a similarity value to the reference image characteristics of a specified value or greater.

The first detection section 22 may employ characteristics representing image configuration (composition), characteristics representing, for example, color and luminance placement and distribution, characteristics obtained by a wavelet transform, and the like as the image characteristics. When such image characteristics are extracted, these characteristics may be extracted from the whole of each frame, or may be characteristics extracted from a portion of each frame (for example, a ballpark fence, or wall region included in the captured footage). In actual captured footage, even for the same specific cut considerable discrepancies can arise in the configuration of the image, such as slight variations in camera angle, differences in where players stand, changes to background signboards, and the like. When image characteristics are extracted from the whole of frames, image characteristics may be extracted that suppress the effects of such considerable discrepancies arising in the configuration of the image. For example when image characteristics are extracted from a portion of a frame, image characteristics are extracted from a region that excludes a region, such as a region representing a background signboard for example, in which considerable variation arises in the configuration of the image. Employing image characteristics extracted in this manner enables an increase in precision of similarity determination.

Plural types of reference image characteristics may be prepared in consideration of differences in the background of each ballpark, different colors of uniforms worn by players, variation in overlay formats of each broadcaster, and the like. In such cases, the first detection section 22 may acquire data such as the ballpark, the teams, and the broadcaster, together with the edited footage, and may select and use the reference image characteristics in accordance with the acquired data. Regarding variation in camera angle, it is conceivable that variations in camera angle and image characteristics may arise depending on the dominant hand of the pitcher or batter. Accordingly, reference image characteristics may be prepared for different pitcher and batter dominant hands (for example, four patterns such as pitcher: left-handed throw and batter: left-handed bat, pitcher: left-handed throw and batter: right-handed bat, pitcher: right-handed throw and batter: left-handed bat, and pitcher: right-handed throw and batter: right-handed bat). Then, the frames representing the specific cut may be extracted when one of the prepared reference image characteristics is matched.

The first detection section 22 may extract, as image characteristics, characteristics indicating movement that characteristically indicates players in footage of the specific cut, such as the pitching form of the pitcher. For example, a movement vector at a characteristic point may be extracted as an image characteristic. In such cases, even when the ballpark, the teams, the overlay format, and the like vary, image characteristics that suppress the effects of such variation can be extracted.

Figure 4:
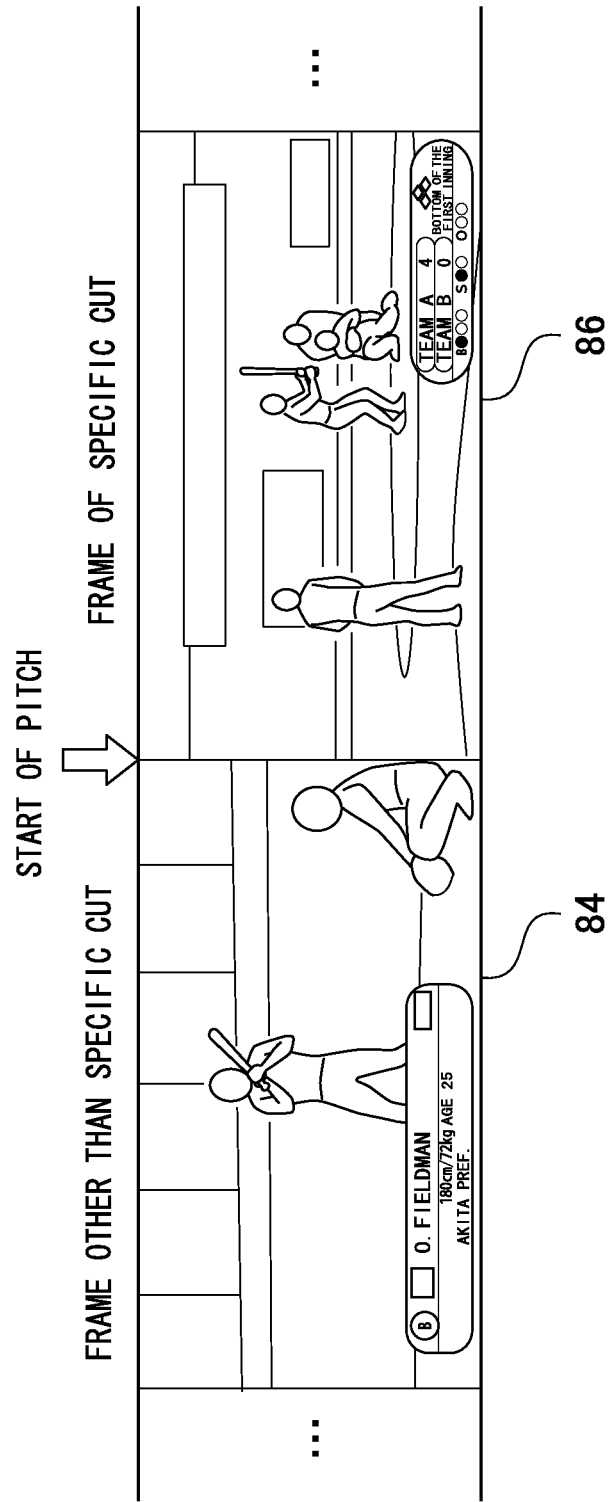
FIG. 4 is a diagram explaining a frame representing the start of a pitch.

Based on frames representing the extracted specific cut, the first detection section 22 detects as frames representing the start of a pitch, frames in which transition was made from a frame other than frames representing specific cuts, to a frame representing a specific cut. For example, as illustrated in FIG. 4, a frame 84 is considered a frame other than the frames representing specific cuts, and a frame 86 that follows the frame 84 is considered a frame that represents a specific cut. In this case, the first detection section 22 detects the frame 86 as a frame representing the start of a pitch.

Figure 5:
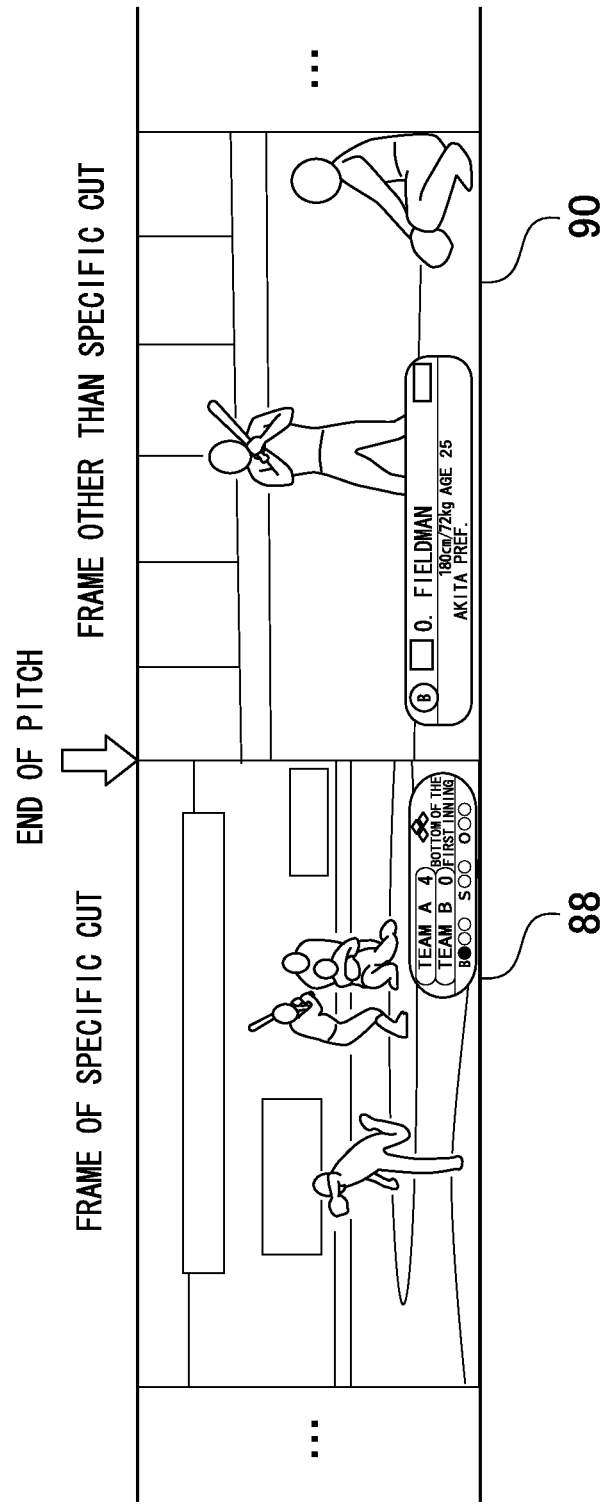
FIG. 5 is a diagram explaining a frame representing the end of a pitch.

The first detection section 22 detects as frames representing the end of a pitch, frames in which transition was made from a frame representing a specific cut, to a frame other than the frames representing specific cuts. For example, as illustrated in FIG. 5, a frame 88 is considered a frame representing a specific cut, and a frame 90 that follows the frame 88 is considered a frame other than a frame representing the specific cut. In this case, the first detection section 22 detects the frame 88 as a frame representing the end of a pitch. Namely, the first detection section 22 detects a segment in which frames representing a specific cut, from a frame representing the start of a pitch to a frame representing the end of a pitch, are consecutive as a segment representing a single pitch by a pitcher.

Figure 6:
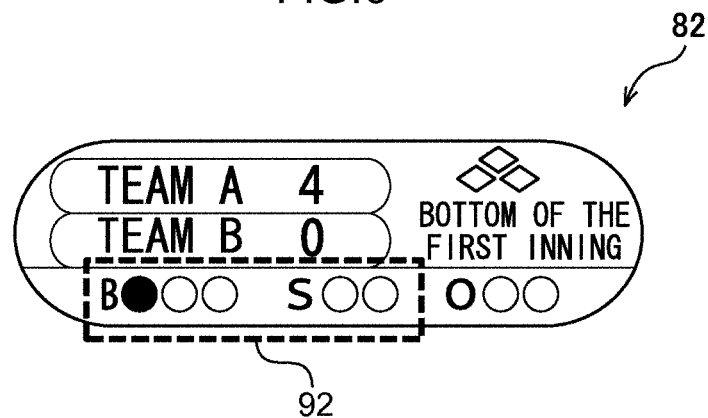
FIG. 6 is a diagram illustrating an example of an overlay that displays a game status.

For each segment detected by the first detection section 22, the second detection section 24 determines whether or not the ball count display in the segment is in an initial state. Specifically, the second detection section 24 extracts a ball count display displaying a ball count from the overlay 82 displaying game status included in at least one frame in each segment. The ball count is a determination result of whether pitches by a pitcher were balls or strikes. The second detection section 24 extracts a ball count display 92, like that illustrated in FIG. 6 for example, from the overlay 82 displaying the game status added to frames in the segment. Extraction of the ball count display 92 may, for example, be an extraction of a predetermined region as a region displaying an overlay displaying the game status in the frame, or an extraction using pattern matching. Moreover, the ball count display may be extracted using character recognition processing. In the example of FIG. 6, "B●○○ S○○" (1 ball, 0 strikes) is extracted as the ball count display.

In consideration of variation in the format of the overlay for each editor of the edited footage or broadcaster, the format of the overlay to be extracted may be changed as appropriate for each editor of the edited footage or broadcaster. Data that specifies plural respective overlay formats corresponding to plural respective editors of edited footage or plural broadcasters may be pre-stored in the storage section 46 to be used as appropriate by the second detection section 24 for each editor of the edited footage or broadcaster.

The second detection section 24 determines whether or not the ball count display extracted for each segment shows the initial state, namely, a ball count of 0 balls and 0 strikes (denoted "0-0" below; similar applies to other ball counts). This determination may be performed using pattern matching or character recognition processing. When the ball count display displays the initial state, the second detection section 24 detects that segment as a segment representing the start of a plate appearance.

The generation section 26 generates metadata indicating the start of each pitch by a pitcher, and metadata indicating the end of each pitch, based on the frames detected by the first detection section 22. Specifically, the generation section 26 generates metadata that associates data representing the starts of the pitches to time data associated to the frames representing the start of a pitch as detected by the first detection section 22. Similarly, the generation section 26 generates metadata that associates data representing the ends of the pitches to time data associated to the frames representing the end of a pitch as detected by the first detection section 22. Note that the generation section 26 may associate the metadata to frames.

The generation section 26 generates metadata indicating the start of each plate appearance, and metadata indicating the end of each plate appearance, based on segments detected by the second detection section 24. Specifically, the generation section 26 generates metadata that associates data indicating the starts of plate appearances to time data associated to the leading frames of segments detected by the second detection section 24. Similarly, the generation section 26 generates metadata that associates data indicating the ends of plate appearances to time data associated to the final frames in segments prior to the segments detected by the second detection section 24.

Figure 7:
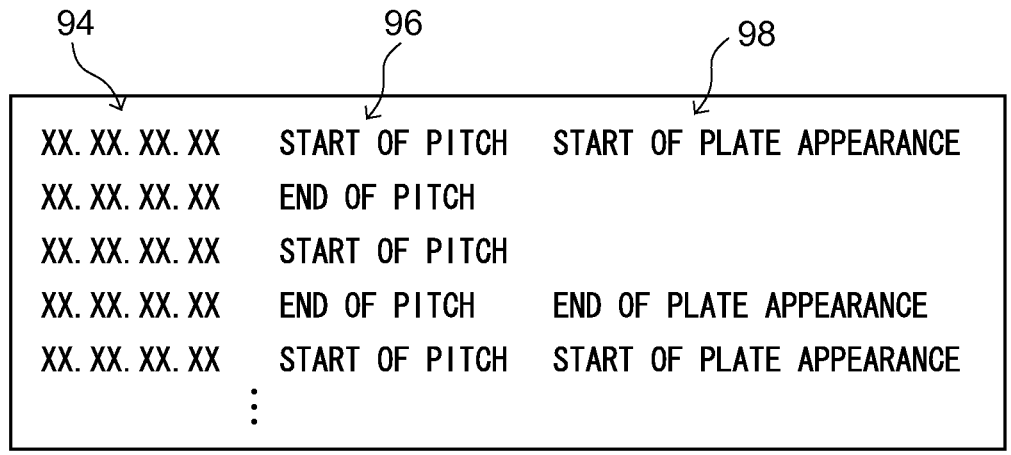
FIG. 7 is a diagram illustrating an example of a metadata file.

The generation section 26 generates a metadata file that stores the plural generated metadata in the sequence of the time data included in the metadata. The metadata file may be generated as a file formatted as, for example, a csv (comma-separated values) file. An example of a metadata file is illustrated in FIG. 7. In the example of FIG. 7, each row represents a single item of metadata, and each item of metadata includes time data 94, data representing the start or end of a pitch (reference numeral 96), and data representing the start or the end of a plate appearance (reference numeral 98).

Although explanation is given here regarding a case in which metadata is generated using time data associated to frames, metadata may be generated using other data for identifying respective frames, such as frame numbers.

The edited footage is appended with the generated metadata file, and transmitted by the generation section 26 to the distribution device 30 as the metadata appended footage.

Figure 8:
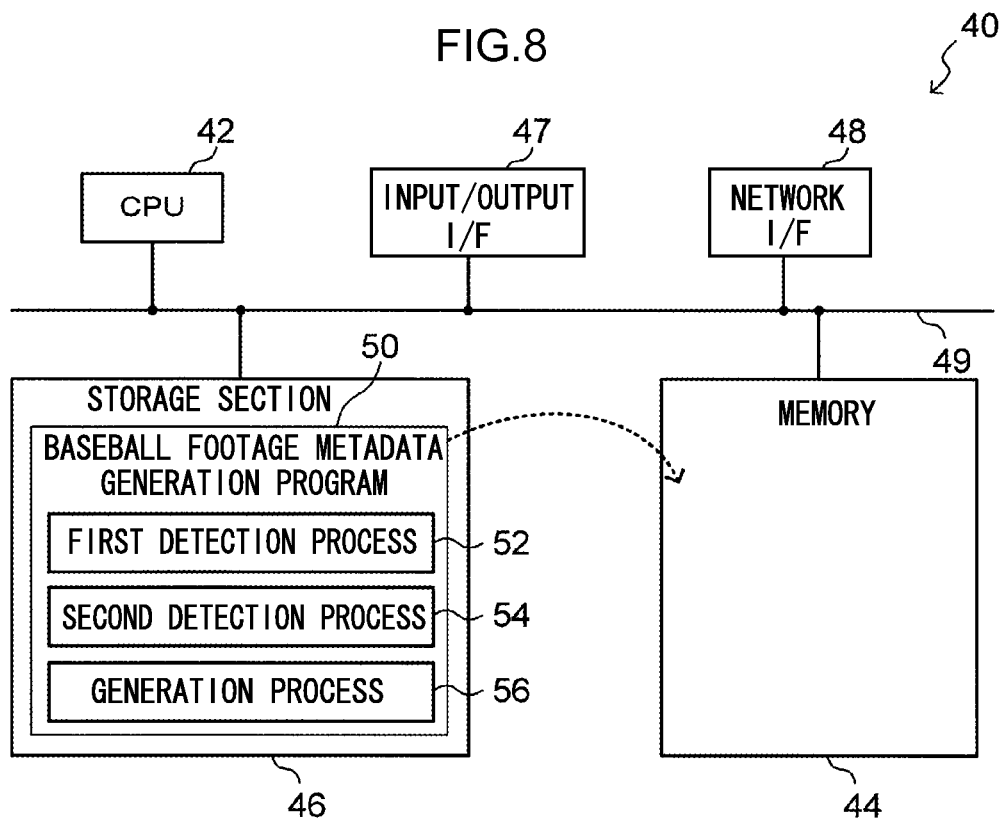
FIG. 8 is a schematic block diagram illustrating an example of a computer that functions as a baseball footage metadata generation device.

The baseball footage metadata generation device 20 may be implemented by, for example, a computer 40 illustrated in FIG. 8. The computer 40 includes a CPU 42, memory 44, a non-volatile storage section 46, an input/output interface (I/F) 47, and a network I/F 48. The CPU 42, the memory 44, the storage section 46, the input/output I/F 47, and the network I/F 48 are mutually connected through a bus 49.

The storage section 46 may be implemented by a hard disk drive (HDD), flash memory, or the like. The storage section 46, serving as a storage medium, is stored with a baseball footage metadata generation program 50 that causes the computer 40 to function as the baseball footage metadata generation device 20. The baseball footage metadata generation program 50 is read from the storage section 46, and expanded into the memory 44, and a process including the baseball footage metadata generation program 50 sequentially executed by the CPU 42.

The baseball footage metadata generation program 50 includes a first detection process 52, a second detection process 54, and a generation process 56. The CPU 42 operates as the first detection section 22 illustrated in FIG. 1 by executing the first detection process 52. The CPU 42 operates as the second detection section 24 illustrated in FIG. 1 by executing the second detection process 54. The CPU 42 operates as the generation section 26 illustrated in FIG. 1 by executing the generation process 56. Thus, the computer 40 executing the baseball footage metadata generation program 50 functions as the baseball footage metadata generation device 20.

Figure 9:
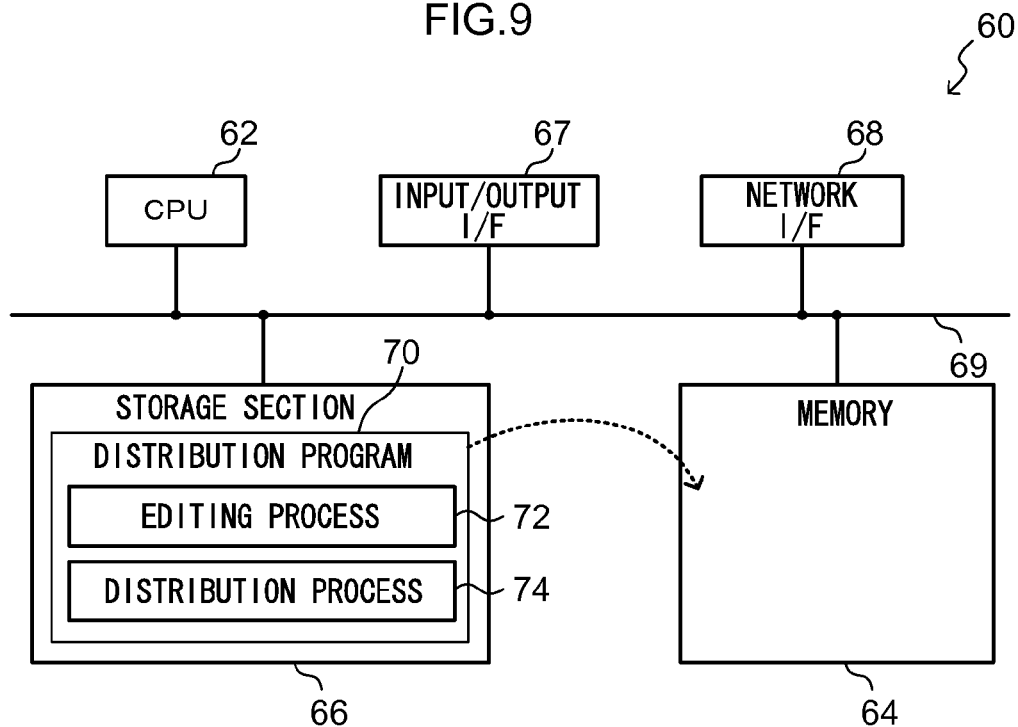
FIG. 9 is a schematic block diagram illustrating an example of a computer that functions as a distribution device.

The distribution device 30 may be implemented by, for example, a computer 60 illustrated in FIG. 9. The computer 60 includes a CPU 62, memory 64, a non-volatile storage section 66, an input/output I/F 67, and a network I/F 68. The CPU 62, the memory 64, the storage section 66, the input/output I/F 67, and the network I/F 68 are mutually connected through a bus 69. Moreover, a display device and an input device, not illustrated in the drawings, are connected to the computer 60 through the input/output I/F 67.

The distribution device 30 and the baseball footage metadata generation device 20 are connected through the network I/F 68 of the distribution device 30, the network, and the network interface 48 of the baseball footage metadata generation device 20.

The storage section 66 may be implemented by a HDD, flash memory, or the like. The storage section 66, serving as a storage medium, is stored with a distribution program 70 that causes the computer 60 to function as the distribution device 30. The distribution program 70 is read from the storage section 66 and expanded into the memory 64, and a process including the distribution program 70 is sequentially executed by the CPU 62.

The distribution program 70 includes an editing process 72, and a distribution process 74. The CPU 62 operates as the editing section 32 illustrated in FIG. 1 by executing the editing process 72. Moreover, the CPU 62 operates as the distribution section 34 illustrated in FIG. 1 by executing the distribution process 74. Thus the computer 60 executing the distribution program 70 functions as the distribution device 30.

Note that the baseball footage metadata generation device 20, and the distribution device 30 can respectively be implemented by, for example, a semiconductor integrated circuit, more specifically, by an application specific integrated circuit (ASIC), or the like.

Next, explanation is given regarding operation of the footage distribution system 10 according to the first exemplary embodiment. When the captured footage is input to the distribution device 30, the distribution device 30 executes editing processing illustrated in FIG. 10, and outputs the edited footage. Next, when the edited footage is input to the baseball footage metadata generation device 20, the baseball footage metadata generation device 20 executes baseball footage metadata generation processing illustrated in FIG. 11, and outputs the metadata appended footage. Then, when the metadata appended footage is input to the distribution device 30, the distribution device 30 executes distribution processing illustrated in FIG. 12, and outputs the distribution footage. Each processing is described in detail below.

Figure 10:
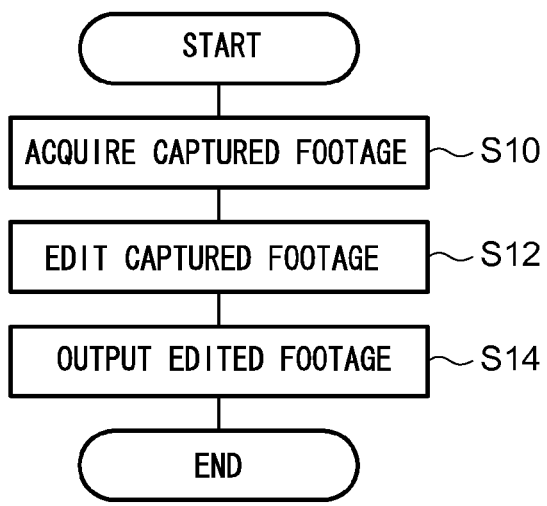
FIG. 10 is a flowchart illustrating an example of editing processing.

First, at step S10 of the editing processing illustrated in FIG. 10, the editing section 32 acquires the captured footage. Next, at step S12, the editing section 32 applies editing commands, designated by the operation of an operator using the display device and input device, not illustrated in the drawings, to the captured footage using image processing. Next, at step S14, the editing section 32 transmits the edited footage to the baseball footage metadata generation device 20, and the editing processing ends.

Figure 11:
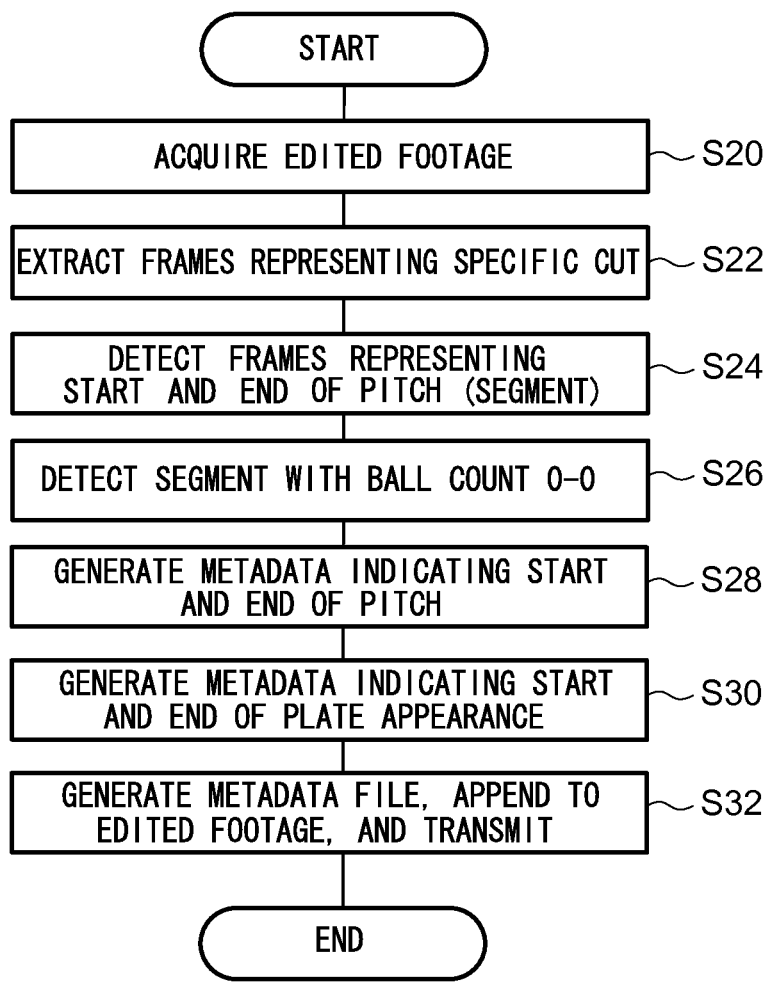
FIG. 11 is a flowchart illustrating an example of baseball footage metadata generation processing according to the first exemplary embodiment.

Next, at step S20 of the baseball footage metadata generation processing illustrated in FIG. 11, the first detection section 22 acquires the edited footage transmitted from the distribution device 30.

Next, at step S22, the first detection section 22 extracts frames representing the specific cut from each of plural frames included in the edited footage. Specifically, the first detection section 22 extracts extracted image characteristics from each of the plural frames included in the edited footage. Then, the first detection section 22 derives the similarity value between the pre-prepared reference image characteristics and the extracted image characteristics, and frames with extracted image characteristics having a similarity value to the reference image characteristics of the specified value or greater are extracted as frames representing the specific cut.

Next, at step S24, based on the frames representing the extracted specific cuts, the first detection section 22 detects as a frame representing the start of a pitch, frames in which transition was made from a frame other than frames representing the specific cut, to a frame representing a specific cut. Similarly, the first detection section 22 detects as a frame representing the end of a pitch, frames in which transition was made from a frame representing a specific cut, to a frame other than frames representing the specific cut. Namely, the first detection section 22 detects a segment in which frames representing a specific cut, from a frame representing the start of a pitch to a frame representing the end of a pitch, are consecutive as a segment representing a single pitch by a pitcher.

Next at step S26, the second detection section 24 extracts the ball count display displaying the ball count from the overlay 82 displaying the game status included in at least one frame in each of the segments detected by the first detection section 22. Then, the second detection section 24 detects any segments in which the ball count display displays an initial state (0-0) as segments indicating the start of a plate appearance.

Figure 13:
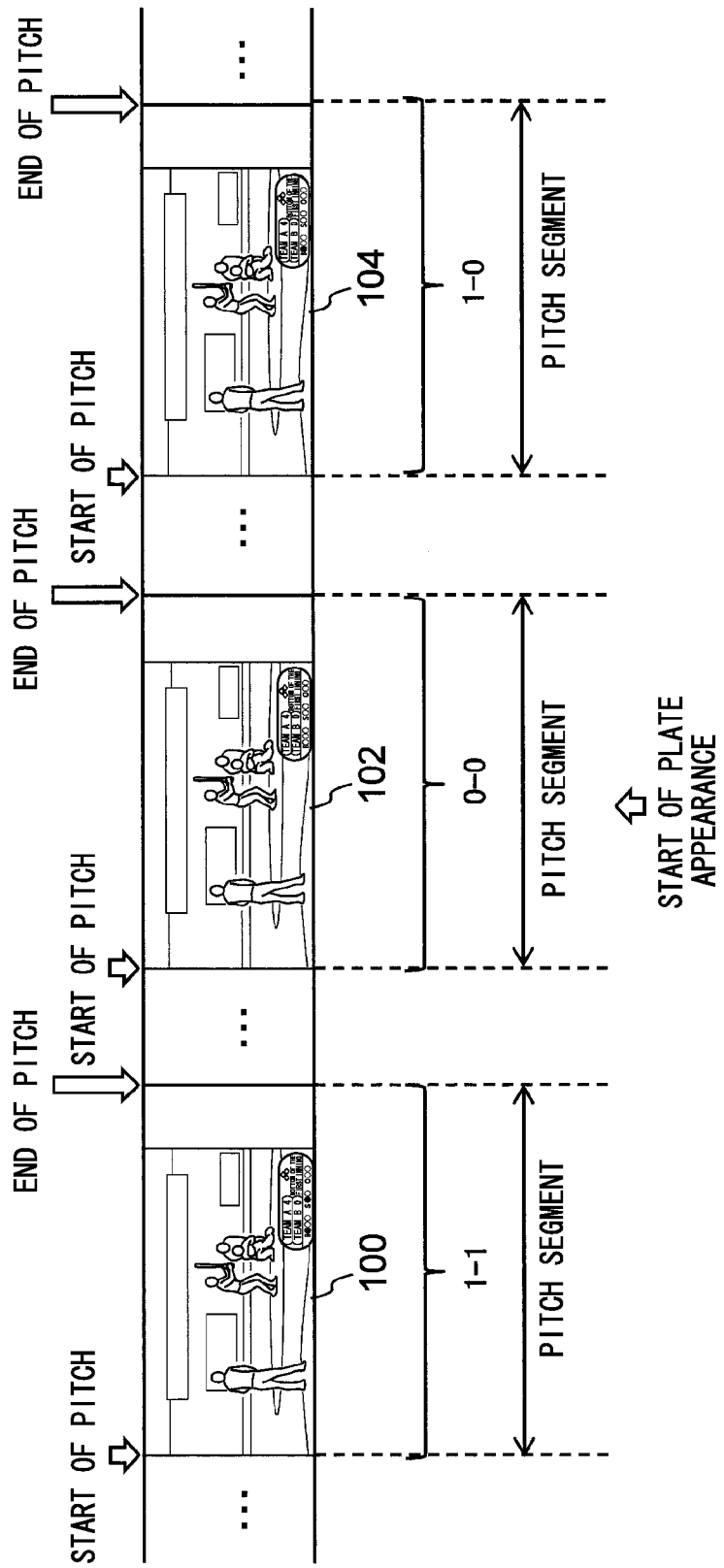
FIG. 13 is a diagram explaining frames representing the starts of pitches, frames representing the ends of pitches, and a segment representing the start of a plate appearance.

FIG. 13 schematically illustrates an example in which frames representing the start of a pitch, frames representing the end of a pitch, and a segment representing the start of a plate appearance have been detected. Note that FIG. 13 is an example in which for each of the segments respectively starting from frames 100, 102, and 104, the ball count displays are respectively "1-1", "0-0", and "1-0", and the segment starting from the frame 102 is detected as a segment representing the start of a plate appearance.

Next, at step S28, the generation section 26 generates metadata that associates data representing the starts of the pitches to time data associated to the frames representing the start of a pitch as detected by the first detection section 22. Similarly, the generation section 26 generates metadata that associates data representing the ends of the pitches to time data associated to the frames representing the end of a pitch as detected by the first detection section 22.

Next, at step S30, the generation section 26 generates metadata that associates data representing the start of a plate appearance to time data associated to the leading frames in the segments detected by the second detection section 24. Similarly, the generation section 26 generates metadata that associates data representing the end of a plate appearance to time data associated to the final frame in the segment prior to the segment detected by the second detection section 24.

Next, at step S32, the generation section 26 generates the metadata file that stores the plural metadata generated at steps S28 and S30 above in the sequence of the time data included in the metadata. Then, the generated metadata file is appended to the edited footage, and transmitted to the distribution device 30 as the metadata appended footage by the generation section 26, and the baseball footage metadata generation processing ends.

Figure 12:
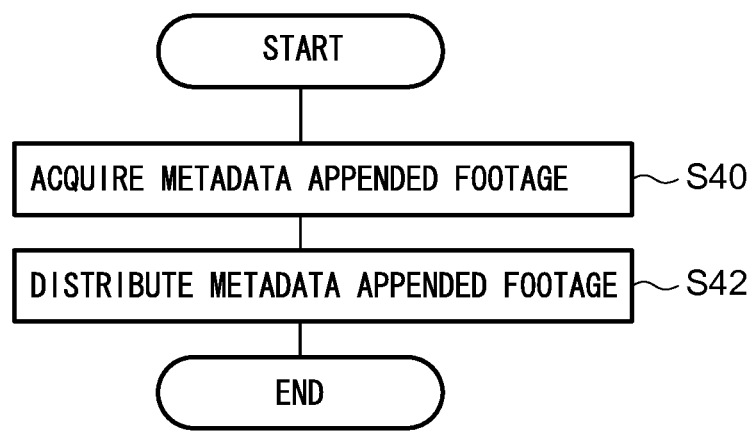
FIG. 12 is a flowchart illustrating an example of distribution processing.

Next, at step S40 of the distribution processing illustrated in FIG. 12, the distribution section 34 acquires the metadata appended footage transmitted from the baseball footage metadata generation device 20. Next, at step S42, the metadata appended footage is converted to distribution footage according to the specified standards, and distributed to the distribution destination terminal (omitted from illustration in the drawings) by the distribution section 34, and the distribution processing ends.

As explained above, according to the baseball footage metadata generation device 20 according to the first exemplary embodiment, frames representing a specific cut captured in the batter-direction from behind the pitcher are detected from captured footage of a baseball game. A segment in which frames representing this specific cut are consecutive is then designated as a segment representing a single pitch by a pitcher, and, out of this segment, a segment in which the obtained ball count display enters the initial state is detected as a segment representing the start of a plate appearance. Then, metadata is generated that associates data indicating the start of the plate appearance to time data of the leading frame in the segment representing the start of the plate appearance. Automatic generation is thereby enabled of metadata enabling cueing of footage from each plate appearance from captured footage of a baseball game.

The metadata appended footage according to the technology disclosed herein enables cueing in baseball game footage (captured footage, or edited footage) in pitch units and plate appearance units, based on the metadata, enabling, for example, simple specification and viewing of footage from during a pitcher's pitch, footage of a batter's plate appearance, replays, or the like.

Second Exemplary Embodiment

Next, explanation follows with regards to a second exemplary embodiment. Note that the same reference numerals are appended for parts similar to those of the footage distribution system 10 according to the first exemplary embodiment, and detailed explanation thereof is omitted.

As illustrated in FIG. 1, a footage distribution system 210 according to the second exemplary embodiment includes a baseball footage metadata generation device 220, and a distribution device 30. The baseball footage metadata generation device 220 includes a first detection section 22, a second detection section 224, and a generation section 26.

Similarly to the second detection section 24 of the first exemplary embodiment, the second detection section 224 detects a segment in which the ball count enters initial state (0-0) as a segment representing the start of a plate appearance.

Sometimes, a ball count in the state of "0-0" does not change and the ball count remains at "0-0" even after a pitch is thrown by a pitcher. For example, sometimes the first pitch results in a hit or an out for the batter. Also, sometimes a pitch does not accompany a change in batter (for example, a pickoff or the like). Although there is no problem in the former case since each segment in which the ball count is "0-0" is the start of a plate appearance, in the latter case the batter does not change even in a segment in which the ball count is "0-0", and detection as the start of the first plate appearance is sometimes inappropriate.

Figure 14:
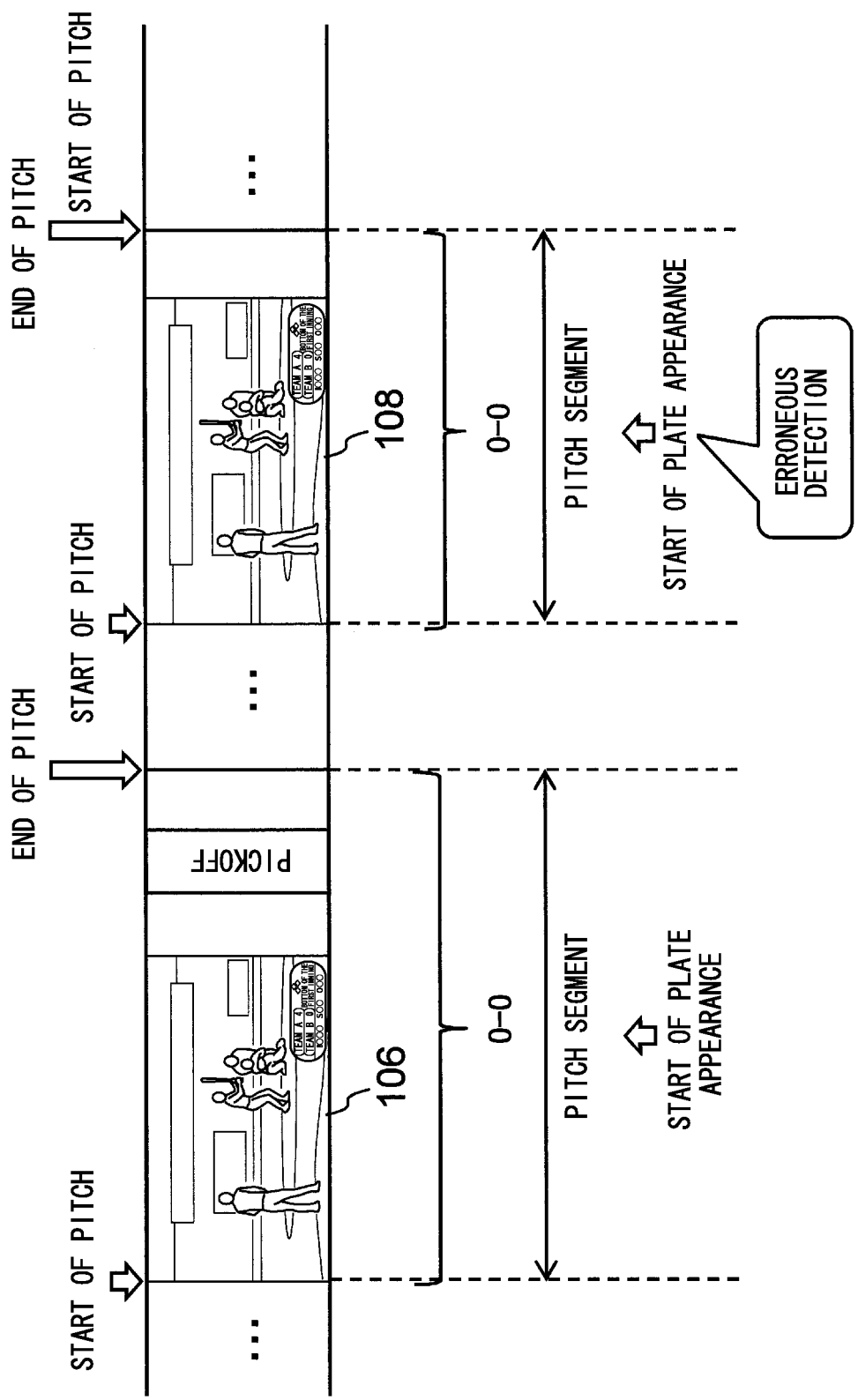
FIG. 14 is a diagram explaining a case in which the batter does not change even though a ball count is in an initial state.

For example, as illustrated in FIG. 14, in the segment starting from frame 106, the pitcher has thrown a pickoff from a state in which the ball count is "0-0". In such cases, since transition is made from a specific cut to footage other than the specific cut, such as a captured cut of a runner, this is detected as a frame indicating the end of the pitch before the next pitch. Then, since the segment starting from frame 108, this being the segment following the segment starting from the frame 106, also has a ball count of "0-0", this may be detected as a segment indicating the start of a plate appearance.

Thus, in cases in which the ball count display indicates the initial state in each of plural consecutive segments, the second detection section 224 is configured not to detect this as a segment representing the start of a plate appearance if not accompanied by a change in batter.

Specifically, when the total of the number of runners, the out count, and the score increases by 1 between a former segment and a latter segment of consecutive segments, the second detection section 224 also detects the latter segment as a segment representing the start of a plate appearance. However, when the total does not change, the second detection section 224 does not detect the latter segment as a segment representing the start of a plate appearance. This is because an increase of 1 in the total of the number of runners, the out count, and the score indicates a change in the batter, and when the total does not change, this indicates that the batter has not changed. As an example, FIG. 15 illustrates whether or not the batter changes for respective outcome results of a current pitch when the status prior to the pitch was a number of runners of 1, an out count of 0, and a score of 0. In FIG. 15, a hit, an RBI hit, a homerun, an out, a double play, a sacrifice fly squeeze, and a sacrifice hit (only to gain a base) are all events in which the batter changes in a baseball game. However, a pickoff, a wild pitch, or the like, are events in which the batter does not change in a baseball game. The second detection section 224 may save the data illustrated in FIG. 15 to the storage section 46 or the like, and determine whether or not there is a change in batter.

FIG. 15 is an example of data determining whether or not there is a change in batter for respective outcome results of a pitch, and there is no limitation to the format of FIG. 15. For example, although the state before the pitch is notated in FIG. 15 for the sake of explanation, the second detection section 224 may determine whether or not there is a change in batter based on data indicating the number of runners, the out count, attributes, totals, and whether or not there is a change in batter. Moreover, although FIG. 15 illustrates a case in which the number of runners is 1, the second detection section 224 may determine whether or not there is a change in batter by a procedure similar to the processing described above even when the number of runners is not 1. Alternatively, the second detection section 224 may perform determination of foul balls and the like by performing determination as to whether or not there is a change in batter in a situation in which, for example, two pitches have been counted as strikes.

Figure 16:
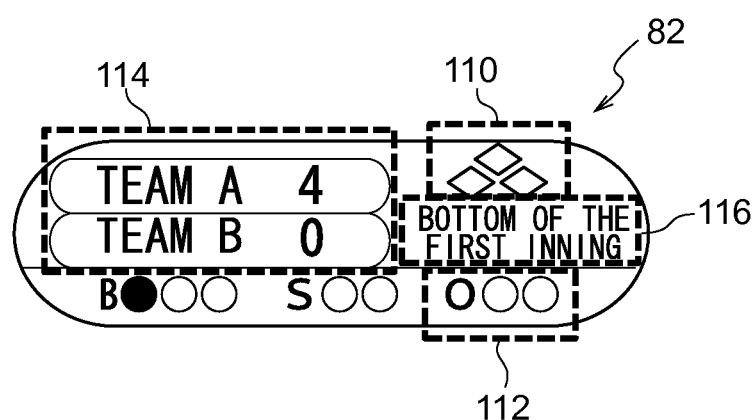
FIG. 16 is a diagram illustrating an example of an overlay displaying game status.

As illustrated in FIG. 16, the second detection section 224 extracts an on-base display 110 displaying an on-base status, an out count display 112 displaying the out count, and a score display 114 displaying the score for each team from the overlay 82 displaying game status. The second detection section 224 moreover acquires the number of runners indicated by the extracted on-base display 110, the out count indicated by the out count display 112, and the score of the batting team indicated by the score display 114. Acquisition of this data may be performed by pattern matching, or character recognition processing on each extracted display. The batting team may be determined based on data obtained from an innings display 116, displaying the current innings, of the overlay 82 displaying game status.

Figure 17:
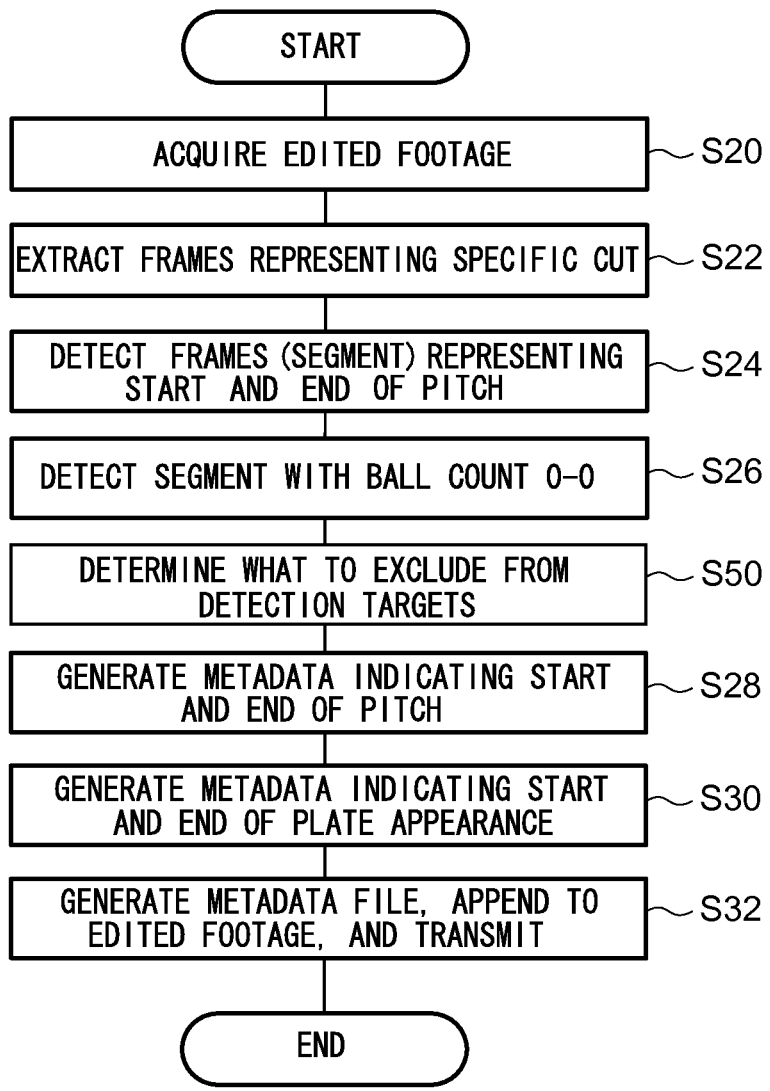
FIG. 17 is a flowchart illustrating an example of baseball footage metadata generation processing in the second exemplary embodiment.

Next, explanation will be given regarding the operation of the footage distribution system 210 according to the second exemplary embodiment. Note that only the baseball footage metadata generation processing is different from the footage distribution system 10 according to the first exemplary embodiment. Explanation is given below, with reference to FIG. 17, regarding the baseball footage metadata generation processing in the second exemplary embodiment. Note that the same reference numerals are appended for processing similar to the baseball footage metadata generation processing according to the first exemplary embodiment, and detailed explanation thereof is omitted.

At steps S20 to S26, similarly to in the first exemplary embodiment, the first detection section 22, and the second detection section 224 detect frames indicating the start of a pitch, frames indicating the end of a pitch, and segments in which the ball count enters the initial state.

Next, at step S50, when the total of the number of runners, the out count, and score do not change between the former segment and latter segment of consecutive segments, the second detection section 224 excludes the latter segment from the segments detected at step S26 above. Subsequent processing is similar to that of the first exemplary embodiment.

As explained above, according to the baseball footage metadata generation device 220 according to the second exemplary embodiment, a segment representing the start of a plate appearance is not detected (detection thereof is suppressed) even when the ball count is in the initial state when it has been determined that there has been no change in batter based on the changes to the display displaying the game status. More precise detection of the start of plate appearances is thereby enabled.

Moreover, in addition to detection of the start of a plate appearance, detection may be made of the start of an inning. For example, the second detection section 224 may acquire the ball count, the number of runners, and the out count. Then, the second detection section 224 may detect as the start of an inning, a frame or plate appearance at which the out count and the number of runners transitions to 0 with the ball count at (0-0). This thereby also enables detection of the starts of innings, in addition to detection of the starts of plate appearances. Alternatively, when discovered that the innings have changed based on the data obtained from the innings display 116, displaying the current innings, of the overlay 82, the second detection section 224 may detect the frame or plate appearance at which the change was discovered as the start of an inning Although in the second exemplary embodiment, explanation has been given regarding a case in which whether or not there is a change in batter is determined based on changes to the total of the number of runners, the out count, and the score, there is no limitation thereto. Determination may be made by comparing how patterns of the number of runners, the out count, and the score have changed from a previous segment against predetermined patterns. For example, a pattern in which the number of runners decreases by 1, the out count increases by 1, and the score does not change, is established as a pattern indicating that the batter does not change. Configuration may be made such that the subsequent segment is not detected as a segment representing the start of a plate appearance when the changes to the number of runners, the out count, and the score from the previous segment correspond to this established pattern.

Figure 18:
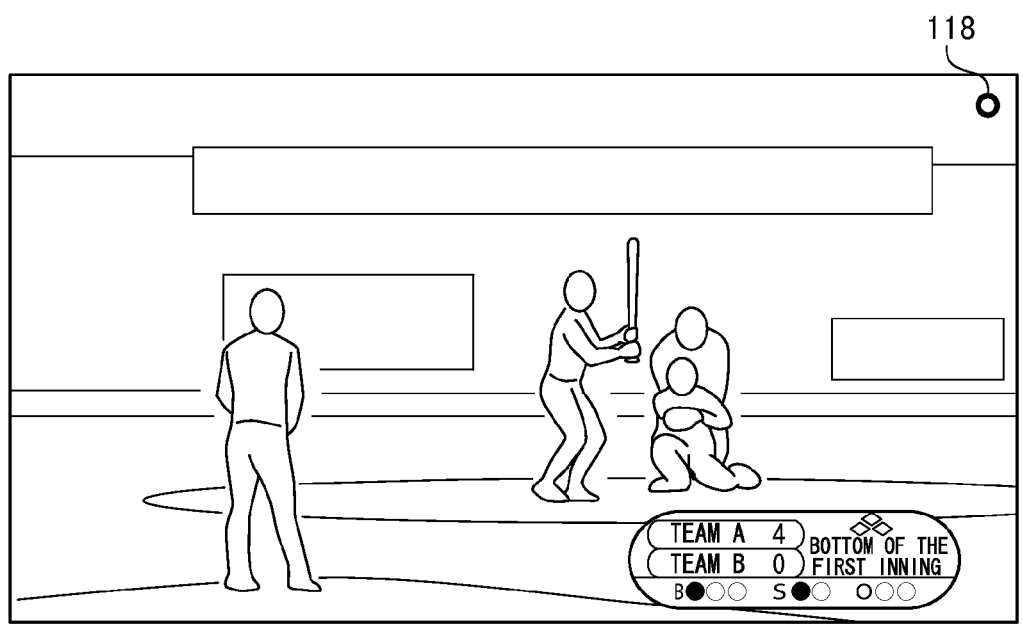
FIG. 18 is a diagram explaining an example of a mark serving as identification data.

Although explanation has been given for each of the exemplary embodiments above for cases in which a frame representing a specific cut is detected based on image characteristics of each frame, there is no limitation thereto. For example, in cases in which edited footage, to which identification data that identifies the specific cut is pre-added to the frames representing the specific cuts, is input, the frames representing the specific cut may be detected using this identification data. The identification data may be added to edited footage as, for example, a mark 118 like that illustrated in FIG. 18.

The identification data may be added during capture of the captured footage, or may be added during editing of the captured footage. For example, a switch may be provided to a camera capturing in the batter-direction from behind the pitcher, and configuration made such that the identification data is added to the captured footage captured by the camera while the switch is pressed. Moreover, configuration may be made such that identification data is always added to any captured footage captured by a camera capturing in the batter-direction from behind the pitcher. The mark 118 is identification data that may be added during editing to add an overlay or the like to captured footage.

Specifically, the first detection section 22 identifies whether or not identification data is added for each frame of edited footage. For example, the first detection section 22 may identify whether or not identification data is added by performing pattern matching, using a pattern representing the identification data, in a predetermined region of each frame. The first detection section 22 extracts as frames representing the specific cut, frames to which identification data is identified to have been added.

When footage in which identification data has been added to the frames indicating the specific cut in this manner can be acquired, this enables detection of frames representing the specific cut to be made by simple processing.

In cases in which the identification data is added during capturing or editing as described above, sometimes the identification data is not added in the exact place where transition is made between a frame other than the frames representing specific cuts, and a frame representing a specific cut. In such cases, the first detection section 22 may detect as the frame representing the start or end of a pitch, a frame several frames before, or after the frames representing the specific cut extracted based on the identification data. In each of the exemplary embodiments above also, a frame several frames before, or after the extracted frames representing the specific cut may be detected as a frame representing the start, or end of a pitch.

Figure 19:
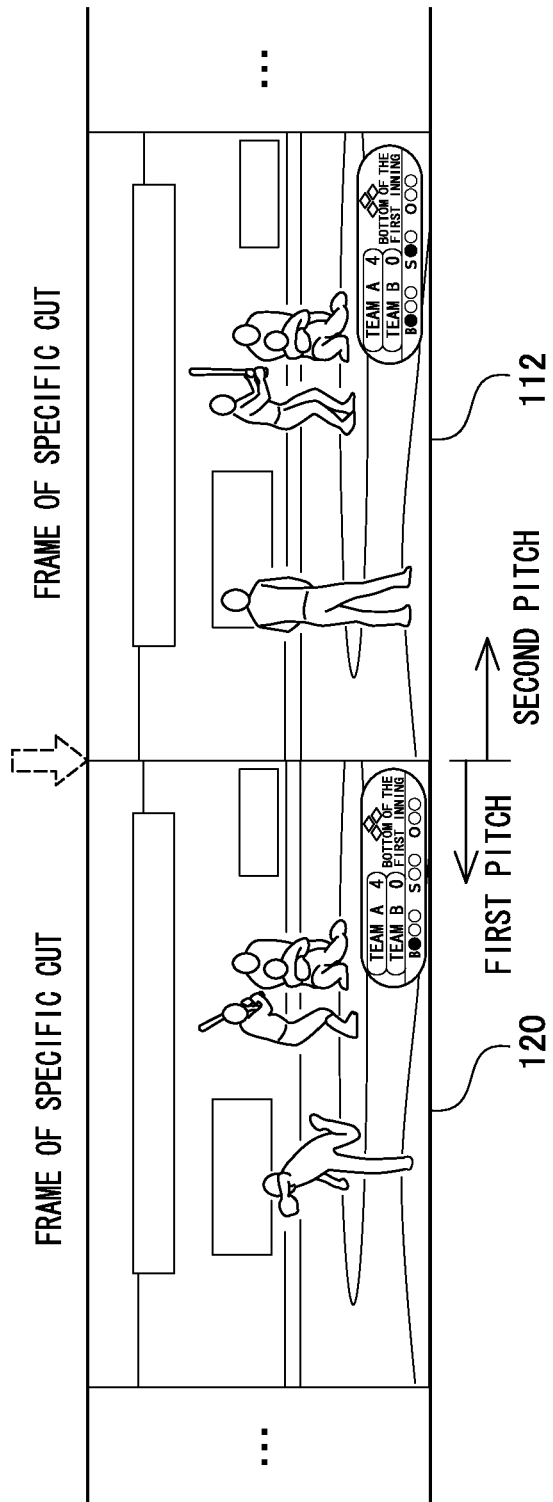
FIG. 19 is a diagram explaining a case in which plural pitching scenes are included in the same specific cut.

Although in each of the exemplary embodiments above, explanation has been given regarding cases in which segments of consecutive frames representing a specific cut are detected as segments representing a pitch, it is conceivable that plural pitching scenes may be included in a single specific cut in the captured footage. For example, as illustrated in FIG. 19, a frame 120 is considered the end of footage of the first pitch, and a following frame 122 onward is considered footage of the second pitch. Since the frame 120 and the frame 122 are both frames representing specific cuts, footage between the two frames, of cuts different from specific cuts between the beginning and end of a pitch are not included. A situation like that illustrated in FIG. 19 may arise of a case in which, for example, plural pitches delivered by a pitcher (for example, two pitches) are captured in the captured footage, without the footage including footage captured by cameras other than the camera capturing the specific cut.

The first detection section 22 extracts the ball count display from the overlay 82, displaying game status, included in each of the frames representing specific cuts. Then, a frame among the consecutive frames representing the specific cut at which the ball count display changes may be detected as a frame corresponding to the start of a pitch. Then, the generation section 26 may denote a frame a specified amount of frames before or after the frame corresponding to the start of the pitch detected by the first detection section 22 based on the change to the ball count display as a frame representing the start of the pitch. The specified amount of frames before or after may be a predetermined number of frames corresponding to the time from the start of a pitch until the ball count display changes, or the time from when the ball count display changes until the pitcher starts the next pitch, based on past game footage or the like.

In such cases, generation of metadata indicating the start of each pitch is enabled even when plural pitching scenes are included in the same specific cut.

Figure 20:
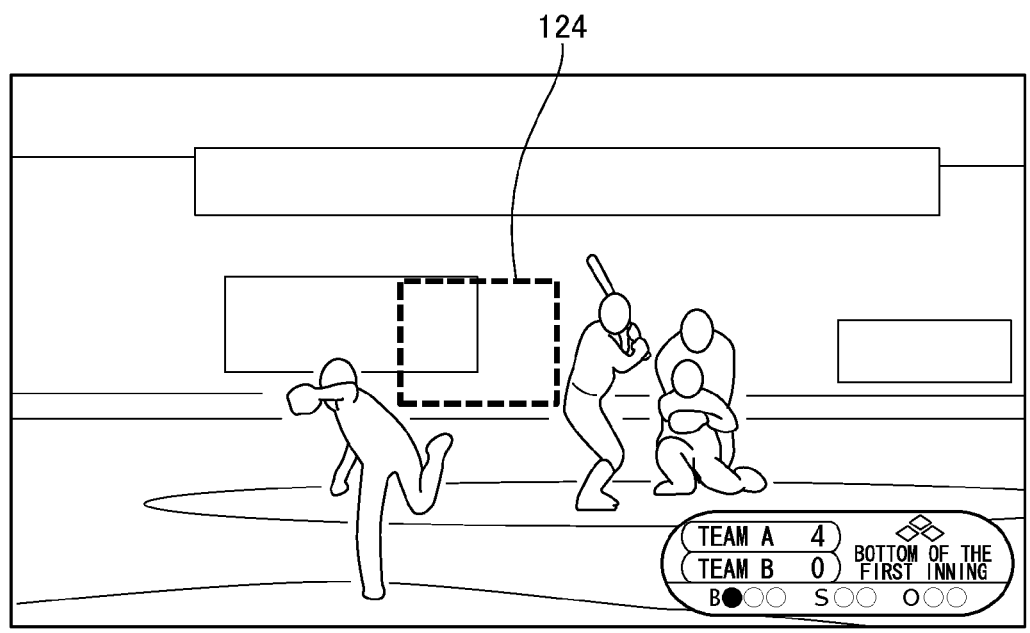
FIG. 20 is a diagram explaining a specified region for detecting a trajectory of a ball.
Figure 21:
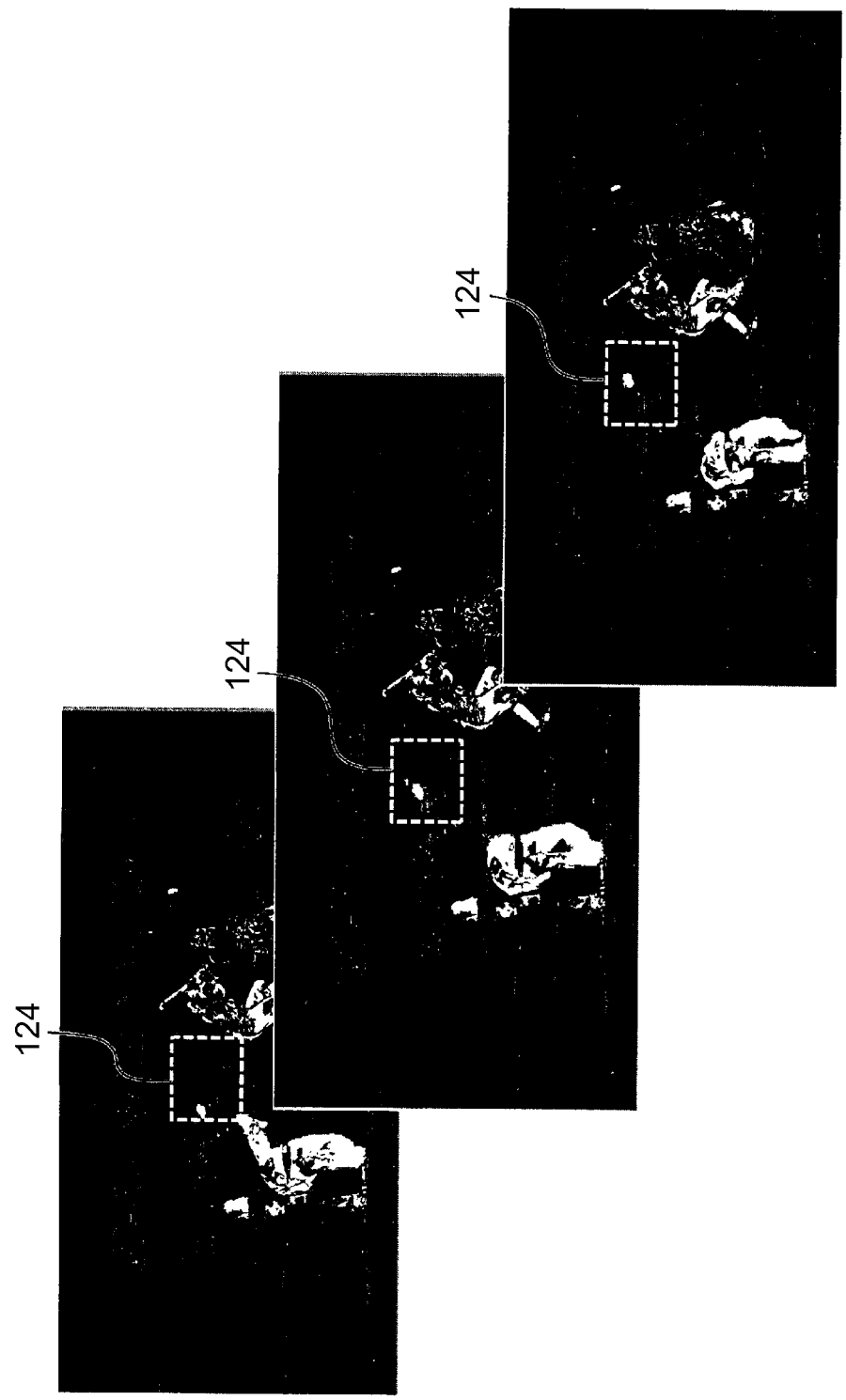
FIG. 21 is a diagram illustrating an example of difference image.

The first detection section 22 may detect as a frame corresponding to the start of a pitch, frames in which a ball trajectory that indicates a pitch in a specified direction by a pitcher appears in a specified region of frames representing plural consecutive specific cuts during consecutive frames representing specific cuts. As illustrated in FIG. 20 for example, a specified region 124 is set between the pitcher and the batter. For example, as illustrated in FIG. 21, the first detection section 22 produces a difference image representing differences between corresponding pixels between the frames representing the consecutive specific cuts. In FIG. 21, the further forward the difference image, the more recent the time data of the source frame. Moreover, in FIG. 21, difference images of the whole of the frames are illustrated; however, a difference image may be produced of the specified region 124 alone.

Figure 22:
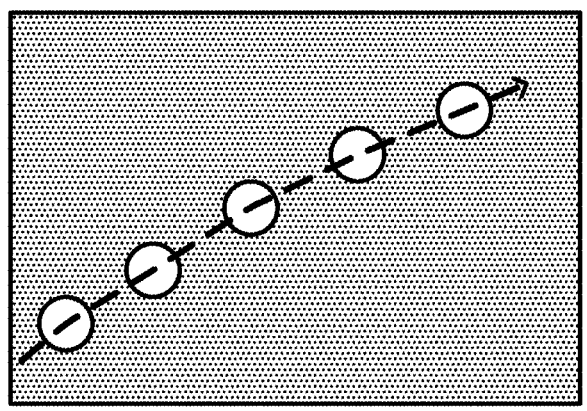
FIG. 22 is a diagram explaining detection of a trajectory of a ball.

When a ball trajectory appears by, for example overlaying plural consecutive difference images, the first detection section 22 determines whether or not the direction of the trajectory is in the specified direction. An example in which 5 difference images are overlaid is illustrated in FIG. 22. Each of the white circles in FIG. 22 is a difference region corresponding to the ball that appears in each difference image, illustrating an example in which the ball trajectory illustrated by the dashed arrow appears due to overlaying the difference images.

Figure 23:
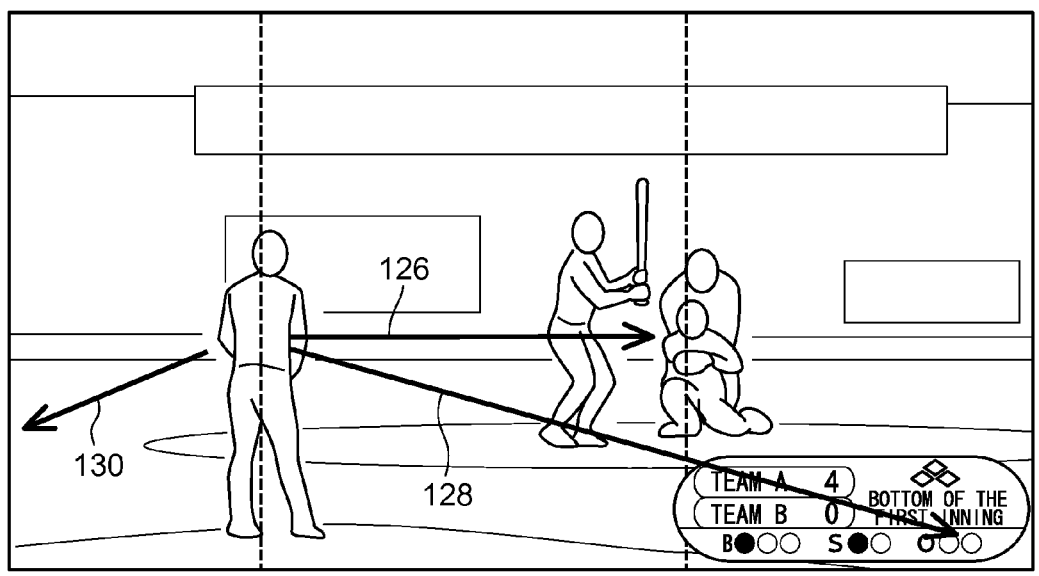
FIG. 23 is a diagram explaining the direction of a trajectory of a ball.

The specified direction is, for example, a direction in the edited footage (or may be in the captured footage) in which the thrown ball travels during a pitcher's pitch. The specified direction may be predetermined, or a position in a captured image of a person such as a batter, catcher, or an umpire may be specified, and the specific direction determined based on the position of the specified person. Although the specified direction is a direction indicating the ball trajectory, a direction enabling distinction between pitches toward the batter, and pickoffs, may also be predetermined. For example, as illustrated in FIG. 23, in a frame representing a specific cut, an arrow 126 indicates a pitch direction toward the batter, and an arrow 128, and an arrow 130 indicate directions of pickoffs. Accordingly, the direction of an arrow 126 may be determined as the specified direction in the example of FIG. 23. The region in which the ball trajectory is detected may also be set as a region able to detect pickoffs, such that whether the detected ball trajectory is a trajectory indicating a pitch toward the batter, or a trajectory indicating a pickoff (a trajectory in the direction of the arrow 128 or the arrow 130 in FIG. 23), are determined in combination. Pitches to the batter are thereby distinguishable from pickoffs in the edited footage (or may be in the captured footage).

The generation section 26 generates metadata that designates, as frames corresponding to the start of a pitch, frames a specified amount of frames before frames corresponding to the start of a pitch, detected based on the ball trajectory by the first detection section 22. The specified amount of frames before may be a predetermined number of frames corresponding to a period from the start of a pitch, until the actual pitch has been delivered, based on past game footage or the like.

In such cases, even when plural pitching scenes are included in the same specific cut, generation of metadata indicating the start of each pitch is enabled. Generation of metadata based on the trajectory of the ball may also be executed in addition to generating metadata indicating the start of a pitch based on changes to the ball count display. In such cases, for example, even when the ball count display does not change, such as in cases in which a batter bats a foul after two strikes, detection of the start of a pitch with good precision is enabled.

Although explanation has been given in each exemplary embodiment described above in which a cut captured in the batter-direction from behind the pitcher is considered the specific cut, the specific cut is not limited thereto. For example, it is sufficient that the specific cut is a cut captured at a characteristic camera angle employed in pitchers' pitching scenes, such as a cut captured from a camera mounted to the head of the umpire (a cut captured from the umpire in the pitcher-direction).

Although explanation in each of the above exemplary embodiments has been given regarding cases in which respective frames representing the starts of pitches, and frames representing the ends of pitches are detected based on specific cuts, there is no limitation thereto. For example, frames a specified amount of frames before a frame representing the next pitch may be detected as frames representing the ends of pitches.

When replays, and digests are included in the footage input to the baseball footage metadata generation device, frames representing the start of a pitch may be detected from a portion from which these are excluded. For example, replays are playback of footage of the previous play, or previous plate appearance, during a comparatively short period in an inning, and digest footage is playback of footage such as a review of the game status up until that point, during a comparatively long period such as between innings. Exclusion of footage portions of replays and digests is enabled by, for example, recognition of overlays displaying that footage is a replay or a digest.

In the case of replay footage, sometimes footage captured from a different camera angle, or footage zoomed in on a given portion is played back. Since the replayed footage is not extracted as a specific cut in such cases, there is no effect on the detection of the frames representing the start of a pitch. Sometimes slow-motion footage is employed as replay footage. In consideration of such cases, frames of slow-motion footage may be excluded from the frames extracted as frames representing the specific cut. Exclusion of slow-motion footage is enabled by, for example, slow-motion determination such as determining whether or not the same frame is repeated a specified number of times.

Although explanation has been given in each exemplary embodiment described above of examples in which in the footage distribution system includes a distribution device, and a baseball footage metadata generation device, there is no limitation thereto. Each functional section of the distribution device, and each functional section of the baseball footage metadata generation device may be implemented by a single computer.

Output from the baseball footage metadata generation device may be used in applications other than a footage distribution system.

Although explanation has been given above of a mode in which the baseball footage metadata generation program 50 is pre-stored (installed) on the storage section 46, and the distribution program 70 is pre-stored (installed) on the storage section 66, provision may be made in a recorded format on a recording medium, such as a CD-ROM, a DVD-ROM, or the like.

One aspect exhibits an advantageous effect of enabling extraction of the start of a plate appearance from captured footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a displaying of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing an extraction program that causes a computer to execute a process, the process comprising:
   acquiring a captured baseball game footage that includes a plurality of frames; and
   extracting, from among plural segments of the captured baseball game footage that each includes consecutive frames representing a pitcher pitching scene, a segment representing a first pitching scene of a plate appearance and further representing an initial state of a ball count indicated by at least one frame of the plural segments.

2. The non-transitory recording medium according to claim 1, wherein
   the process further comprises, in response to consecutive segments of the plural segments each displaying a ball count in the initial state, determining segments to be excluded from extraction targets in the extracting based on changes to a display that displays a game status and is included in at least one frame in each segment,
   the display includes at least data for a number of runners, an out count, and a score, and
   the process further comprises, in response to the consecutive segments of the plural segments each displaying a ball count in the initial state, excluding, from the extraction targets in the extracting, segments in which a total of the number of runners, the out count, and the score is unchanged from a previous segment.

3. The non-transitory recording medium according to claim 1, wherein the process further comprises:
   extracting, from among the plural segments, a segment representing an end of a pitching scene of a plate appearance, by extracting a segment, from the plural segments, that is previous in sequence to the extracted segment representing the first pitching scene.

4. An extraction method, comprising:
   by at least one processor;
      acquiring a captured baseball game footage that includes a plurality of frames; and
      extracting, from among plural segments of the captured baseball game footage that each includes consecutive frames representing a pitcher pitching scene, a frame representing a first pitching scene of a plate appearance and further representing an initial state of a ball count indicated by at least one frame of the plural segments.

5. A baseball footage metadata generation device, comprising:
   a memory storing instructions; and
   at least one processor that executes the instructions to cause the baseball footage metadata generation device to perform:
      in a first detection operation, detecting, from captured footage of a baseball game including a plurality of frames, segments in which frames representing a specific cut captured at a camera angle used in pitcher pitching scenes are consecutive;
      in a second detection operation, detecting segments, from among the segments detected by the first detection operation, that have at least one frame displaying a ball count display in an initial state by determining that the ball count display is in the initial state; and
      generating metadata designating the segments detected in the second detection operation as segments representing starts of respective plate appearances.

6. The baseball footage metadata generation device of claim 5, wherein, the at least one processor executes the instructions to cause the baseball footage metadata generation device to further perform:
   in cases in which the ball count display of each of a plurality of consecutive segments displays the initial state, determining segments to be excluded from detection targets based on changes to a display that displays a game status and is included in at least one frame in each segment.

7. The baseball footage metadata generation device of claim 6, wherein:
   the display that displays the game status includes at least data for a number of runners, an out count, and a score; and
   the at least one processor executes the instructions to cause the baseball footage metadata generation device to further perform, in cases in which the ball count display of each of a plurality of consecutive segments displays the initial state, excluding, from the detection targets, segments in which a total of the number of runners, the out count, and the score is unchanged from a previous segment.

8. The baseball footage metadata generation device of claim 6, wherein:
   the display that displays the game status includes at least data for a number of runners, an out count, and a score; and
   the at least one processor executes the instructions to cause the baseball footage metadata generation device to further perform, in cases in which the ball count display of each of a plurality of consecutive segments displays the initial state, excluding, from the detection targets, segments in which there is a change to a pattern of the number of runners, the out count, and the score from a previous segment and also a change to a predetermined pattern that indicates that the plate appearance has not changed.

* * * * *